US010831492B2

(12) United States Patent
Ayub et al.

(10) Patent No.: US 10,831,492 B2
(45) Date of Patent: Nov. 10, 2020

(54) MOST FAVORED BRANCH ISSUE

(71) Applicant: International Business Machines Corporation, Armonk, NY (US)

(72) Inventors: Salma Ayub, Austin, TX (US); Glenn O. Kincaid, Austin, TX (US); Christopher M. Mueller, Pflugerville, TX (US); Dung Q. Nguyen, Austin, TX (US); Eula Faye Abalos Tolentino, Austin, TX (US); Albert J. Van Norstrand, Jr., Round Rock, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/028,177

(22) Filed: Jul. 5, 2018

(65) Prior Publication Data

US 2020/0012496 A1    Jan. 9, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3851* (2013.01)

(58) Field of Classification Search
None
See application file for complete search history.

(56) References Cited

U.S. PATENT DOCUMENTS

| 6,658,447 | B2 | 12/2003 | Cota-Robles |
| 6,795,845 | B2 | 9/2004 | Kalafatis et al. |
| 6,928,647 | B2 | 8/2005 | Sager |
| 7,366,878 | B1 * | 4/2008 | Mills .................... G06F 9/3838 712/214 |
| 7,673,122 | B1 | 3/2010 | Song et al. |
| 8,255,669 | B2 | 8/2012 | Gschwind et al. |
| 8,516,024 | B2 | 8/2013 | Marr |
| 9,311,142 | B2 | 4/2016 | Yamashita et al. |

(Continued)

OTHER PUBLICATIONS

Mische et al.; "IPC Control for Multiple Real-Time Threads on an In-Order SMT Processor", Fourth International Conference, HiPEAC 2009, Paphos, Cyprus, Jan. 25-28, 2009.

(Continued)

*Primary Examiner* — John M Lindlof
(74) *Attorney, Agent, or Firm* — Scott S. Dobson

(57) ABSTRACT

Systems, methods, and computer program products are disclosed that control issuing branch instructions in a simultaneous multi-threading (SMT) system. An embodiment system includes an SMT processor circuit that receives, from one of a plurality of threads, a branch instruction having a favor bit. The SMT processor circuit schedules the branch instruction to issue, relative to branch instructions received from other threads in the plurality of threads, based on the favor bit. When the favor bit has a first value, the branch instruction is scheduled to have a higher priority to issue before the branch instructions received from other threads in the plurality of threads. When the favor bit has a second value, the branch instruction is scheduled to issue based an age of the branch instruction relative to respective ages of the branch instructions received from other threads in the plurality of threads.

6 Claims, 3 Drawing Sheets

(56) References Cited

U.S. PATENT DOCUMENTS

| | | |
|---|---|---|
| 9,411,662 B2 | 8/2016 | Makljenovic et al. |
| 9,459,918 B2 | 10/2016 | El-Moursy et al. |
| 2009/0193240 A1 | 7/2009 | Gschwind et al. |
| 2009/0210674 A1* | 8/2009 | Luick ................ G06F 9/30054 712/216 |
| 2009/0216962 A1* | 8/2009 | Mutlu ................ G06F 9/4881 711/151 |
| 2011/0029763 A1 | 2/2011 | Tani |
| 2015/0100768 A1 | 4/2015 | Holm, Jr. et al. |

OTHER PUBLICATIONS

Ozer et al.; "Low-Cost Techniques for Reducing Branch Context Pollution in a Soft Realtime Embedded Multithreaded Processor", IEEE 19th International Symposium on Computer Architecture and High Performance Computing, Oct. 24-27, 2007.

Eggers et al.; "Simultaneous Multithreading: A Platform for Next-Generation Processors", IEEE Micro > vol. 17 Issue: 5, Sep.-Oct. 1997.

\* cited by examiner

MOST FAVORED BRANCH ISSUE

FIELD OF THE INVENTION

This disclosure generally relates to scheduling of computational instructions in multi-threaded processors, and particularly to scheduling of branch instructions in processors supporting simultaneous multiprocessing.

BACKGROUND OF THE INVENTION

Branch prediction is a common technique in microprocessors used to speed up information flow through the pipeline. The technique attempts to predict which way a branch will evaluate (taken or not taken) before fetching, loading, and executing further instructions based on the prediction. If the branch prediction is correct, then the pipeline would already be loaded with the instructions following the branch, allowing for a faster information flow through the pipeline. However, if the branch prediction is incorrect, then all the information that was loaded based on the branch prediction must be flushed, causing a significant drop in performance.

For a highly threaded microprocessor, a Branch Issue Queue (BRQ) can be shared between threads to contain and issue branches from multiple threads. If one thread has more branches dispatched to the BRQ, it can consume more issue bandwidth and block the branches from other threads from issuing, thus delaying branch resolutions for those threads, resulting in reduction of performance. In conventional implementations, the issue logic gives priority to the oldest ready branch instruction, therefore younger branches must wait until all older branch instructions have been issued out before they can be issued.

For these and other reasons, there is a need for improvements to scheduling of computational instructions in multi-threaded processors that support simultaneous multiprocessing.

SUMMARY OF THE INVENTION

The disclosed embodiments fulfill a need by providing systems, methods, and computer program products, that provide more efficient scheduling of branch instructions in multi-threaded processors that support simultaneous multiprocessing (SMT). For example, disclosed embodiments provide a mechanism to favor issuing of branches from one thread over the other to make sure that branches from all threads are resolved early and fairly. Additionally, a low confidence branch can be assigned a high-favor status if it needs to be issued out earlier to branch execution and resolution.

A disclosed system includes an SMT processor circuit that receives, from one of a first plurality of threads, a branch instruction comprising a favor bit. The SMT processor circuit then schedules the branch instruction to issue, relative to branch instructions received from other threads in the first plurality of threads, based on the favor bit. When the favor bit has a first value, the SMT processor circuit schedules the branch instruction to have a higher priority to issue before the branch instructions received from other threads in the first plurality of threads. When the favor bit has a second value, the SMT processor circuit schedules the branch instruction to issue based an age of the branch instruction relative to respective ages of the branch instructions received from other threads in the first plurality of threads.

A processor implemented method of issuing branch instructions in a simultaneous multi-threading (SMT) system is also disclosed. The method includes receiving, by a SMT processor circuit, from one of a first plurality of threads, a branch instruction comprising a favor bit. The method further includes scheduling the branch instruction to issue, relative to branch instructions received from other threads in the first plurality of threads, based on the favor bit. When the favor bit has a first value, the method includes scheduling the branch instruction to have a higher priority to issue before the branch instructions received from other threads in the first plurality of threads. When the favor bit has a second value, the method includes scheduling the branch instruction to issue based an age of the branch instruction relative to respective ages of the branch instructions received from other threads in the first plurality of threads.

Computer program products are also disclosed that implement the above-described method and control the above-described system. For example, a non-transitory computer readable storage device is disclosed. The non-transitory computer readable storage device includes computer program instructions stored thereon that, when executed by a simultaneous multi-threading (SMT) processor circuit, cause the SMT processor circuit to perform operations that implement that above-described method and to control the above-described system.

The above summary may present a simplified overview of some embodiments of the invention to provide a basic understanding of certain aspects of the invention discussed herein. The summary is not intended to provide an extensive overview of the invention, nor is it intended to identify any key or critical elements, or to delineate the scope of the invention. The sole purpose of the summary is merely to present some concepts in a simplified form as an introduction to the detailed description presented below.

Further embodiments, features, and advantages, as well as the structure and operation of the various embodiments, are described in detail below with reference to the accompanying drawings.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, explain the embodiments of the invention. In the drawings, like reference numbers generally indicate identical, functionally similar, and/or structurally similar elements.

DETAILED DESCRIPTION

Figure 1:
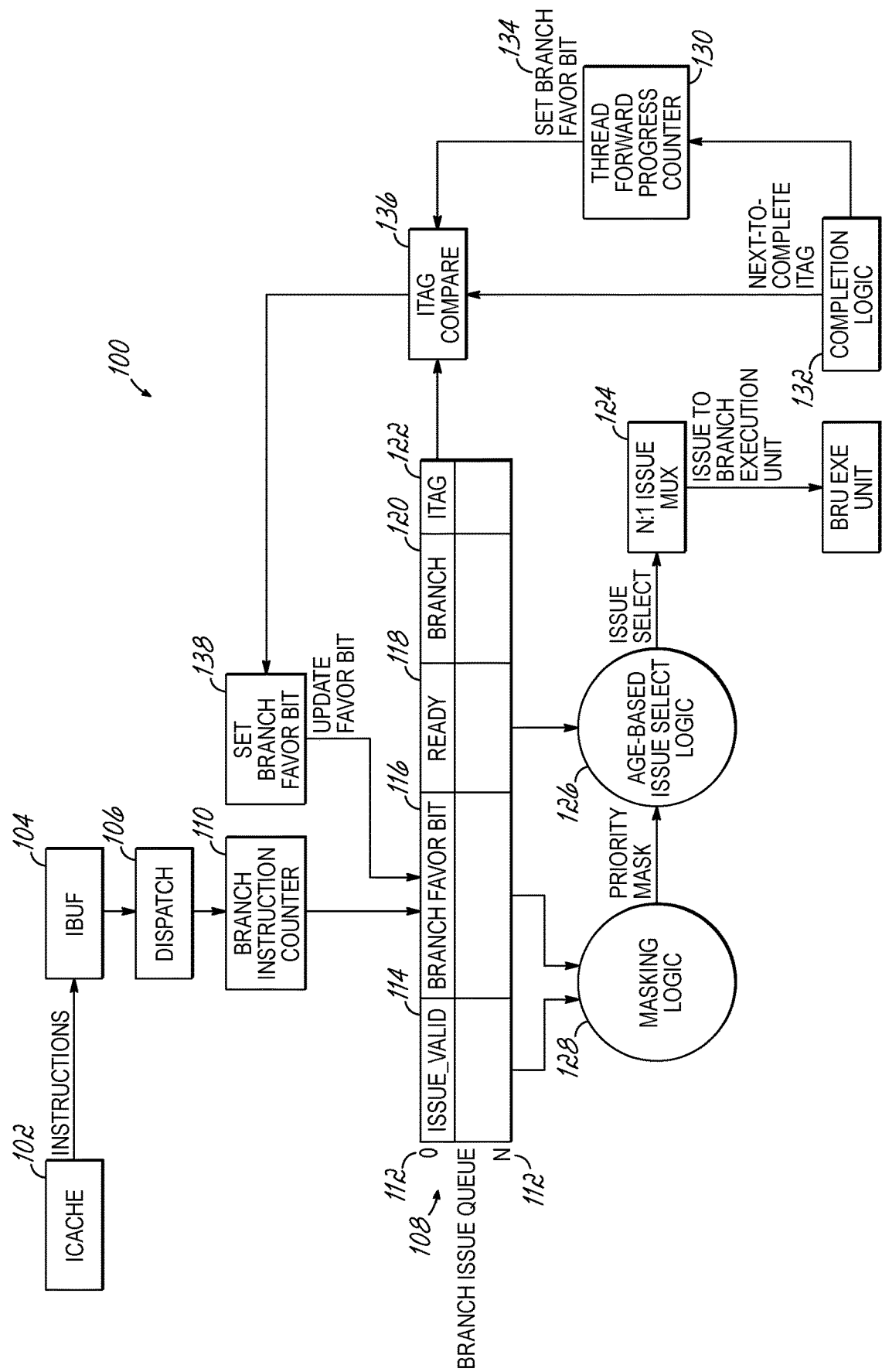
FIG. 1 is a flow chart illustrating use of a favor bit for scheduling branch instructions in an SMT system, according to an embodiment.

This disclosure provides systems, methods, and computer program products that control issuing branch instructions in a simultaneous multi-threading (SMT) system. The disclosed systems and methods provide a mechanism to give higher priority to issue a branch instruction of one thread over other threads. The priority mechanism is achieved by providing a branch instruction with a "favor bit" to indicate that it has the highest priority of issue from a shared Branch Issue Queue (BRQ). A favor bit may be assigned to a branch instruction in several ways, as described in greater detail below.

In an SMT system, if one thread is dispatching too many branches, then branches from other threads may be assigned a favor status to increase their issue priority. The system may maintain a counter for each thread to count the number of branches that are dispatched per thread over a certain time. Each thread's counter may be chosen to only count its dispatched branches and to not include the number of branches dispatched by other threads. For example, if the dispatch logic dispatches 4 branches from thread0 without dispatching any branches from any other threads, then a favor bit status may be assigned to the first branch instruction dispatched from another thread, such as from thread1. For example, the favor-bit for thread1 may be set to a first value (e.g., the value may be set to "1") to elevate the issue priority for an instruction from thread1.

The system may then dispatch a branch instruction into the BRQ along with the favor bit. The favor bit may then be used in conjunction with age detection logic to give issuing priority to branch instructions that have the favor bit set to the first value (e.g., "1" in this example). In addition, the branch dispatch counter may be set to various values to ensure good performance and fairness.

In a further embodiment, the favor bit may be assigned a value in other another way, as follows. Once a branch instruction is dispatched into the BRQ, the system may inspect the next-to-complete instruction (ITAG) for the corresponding thread. If the thread's next-to-complete ITAG is the branch instruction, then the favor-bit for the corresponding queue entry may be set to the first value (e.g., to "1") thereby giving highest issue priority to the branch instruction over branch instructions from other threads, regardless of relative ages of the various branch instructions.

In a further embodiment, the favor bit may be assigned a value as follows. The favor bit may be set based on a thread-forward-progress counter. The thread-forward-progress counter is a thread specific decrementing counter that may count cycles that have occurred since a thread last saw a completion. The counter may be set at various cycle values. When the counter expires and the thread has not seen a completion during the count down, then a signal may be generated to indicate that the thread has stalled. The completion logic may then assign the favor bit status to the next-to-complete ITAG of the corresponding thread to ensure that the oldest instruction of that thread will have the highest priority to issue to therefore ensure forward progress.

The system may compare each branch instruction ITAG (within the BRQ) with the next-to-complete ITAG for the corresponding thread. If there is a match (i.e., if the branch instruction is the next-to-complete instruction) and if the favor bit status from the completion logic has the first value (e.g., "1"), then the system may set the favor bit of the branch instruction in the corresponding BRQ entry to the first value (e.g., to "1"). In this way, a branch instruction that is next-to-complete has a higher issue priority.

Any branches with the favor bit set to the first value will have highest priority to issue from the BRQ. However, if there are multiple branch instructions having the favor bit set to the first value (i.e., branches instructions from different threads may have favor bit set to "1"), then the issue logic may schedule instruction based on age order (i.e., older branch instruction with favor bit=1 may have higher issue priority over younger branch instruction with favor bit=1).

The favor bit of a branch instruction may also be set to a second value (e.g., equal to "0") to indicate that no special treatment is required for the particular branch instruction. As described in greater detail below, when the favor bit has a second value (e.g., "0"), scheduling of the branch instruction is based on age of the branch instruction relative to respective ages of the branch instructions received from other threads. The above methods are described in greater detail below with respect to FIGS. 1 and 2.

FIG. 1 is a flow chart 100 illustrating use of a favor bit for scheduling branch instructions in an SMT system, according to an embodiment. Instructions are fetched from cache memory 102 and are stored in a buffer 104. At this stage, the instructions are considered to be "in order" instructions. The instructions are then dispatched 106 to various queues. For example, branch instructions are dispatched to the BRQ 108. As described above, a branch instruction counter 110 may count all branch instructions from a plurality of threads. In further embodiments, each thread may have a respective branch instruction counter 110. The BRQ 108 may have a number of places 112 corresponding to places in the issue queue. In this example, the places are numbered 0 to N.

Each branch instruction 108 may have a number of data fields. In this example, an issue-valid field 114 indicates that the branch instruction 108 is error free. The branch instruction 108 may have a favor bit 116 as described above. The branch instruction 108 may also have a ready field 118 that indicates whether the branch instruction 108 is free of dependencies and is therefore ready to execute. The branch instruction field 120 and the ITAG field 122 are also shown.

As described above, instructions may be scheduled (i.e., multiplexed) into the issue queue 124 using age based logic. That is, oldest branch instructions may be issued before newer branch instructions. Using age based logic, however, may lead to problems with threads stalling, as described above. Therefore, an additional masking logic 128 based on the favor bit 116 may also be employed to increase the issue priority of one thread over other threads as described above (and discussed in further detail with reference to FIG. 2 below). A thread-forward-progress counter 130 may count the number of cycles that have occurred since a thread has achieved a completion status as determined by the completion logic. The favor bit of a branch instruction may be set 134 to the first value (e.g., to "1") when the value of the thread-forward-progress counter has exceeded a predetermined value.

Also, as described above, the system may compare 136 the branch instruction 120 and the next-to-complete ITAG 122 is the branch instruction. If the result of the comparison is affirmative (i.e., that the next-to-compute instruction for a given thread is the branch instruction) then the favor-bit for the corresponding queue entry may be set to the first value (e.g., to "1") thereby giving highest issue priority to the branch instruction over branch instructions from other threads, regardless of relative ages of the various branch instructions. Thus, according to various rules, the branch favor bit 116 may be updated 138.

Figure 2:
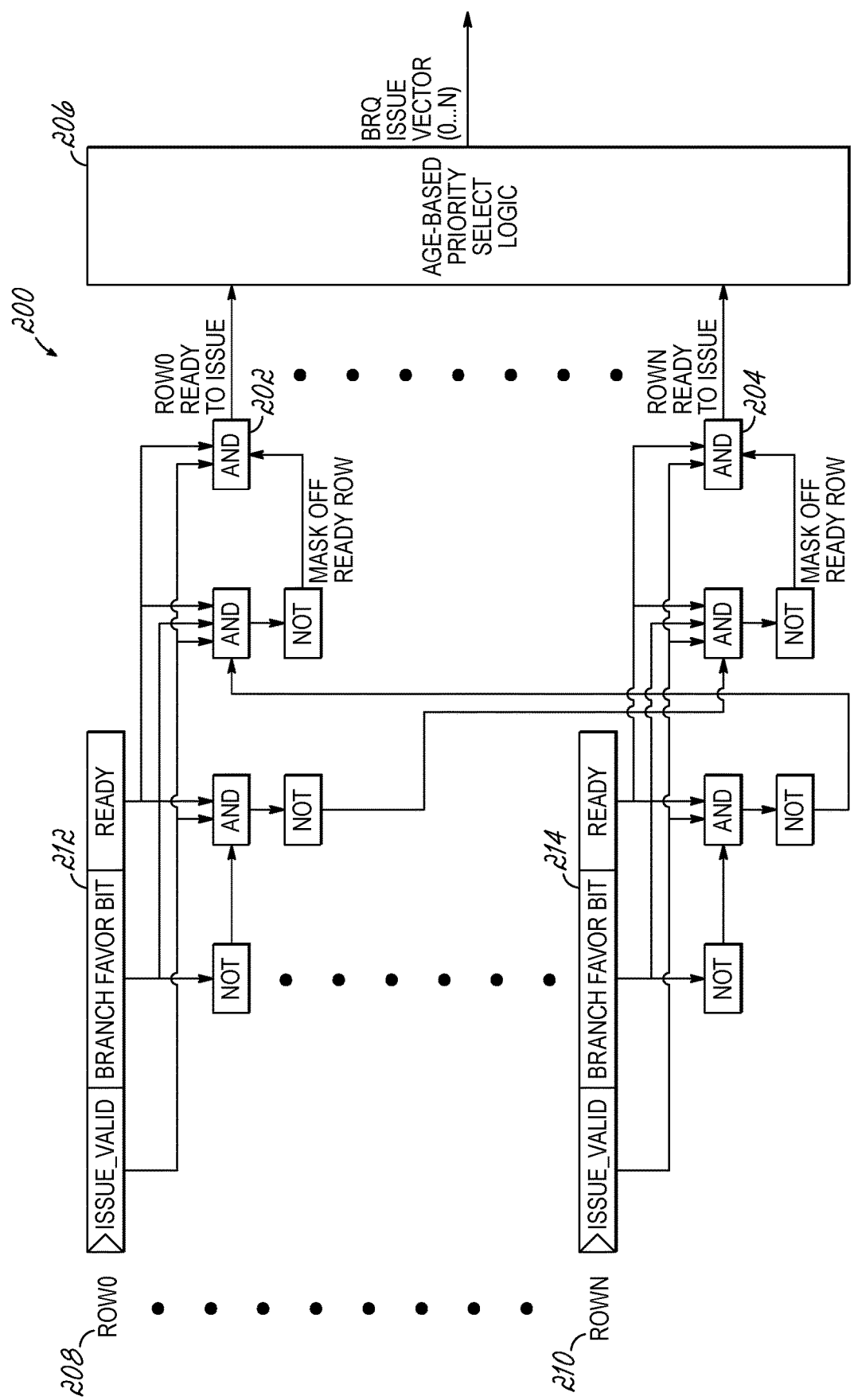
FIG. 2 is a flow chart that provides a detailed view of the favor bit masking logic of FIG. 1, according to an embodiment.

FIG. 2 is a flow chart 200 that provides a detailed view of the favor bit masking logic 128 of FIG. 1, according to an embodiment. In this example, the output of and-gate 202 and the output of and-gate 204 respectively dictate how age based logic 206 schedules threads 208 (Row0) and 210 (RowN). For example, if both rows represent valid issues that are ready to execute and each row has favor bit set to the second value (i.e., set to "0") then the output of and-gates 202 and 204 both have unit value. As such, the age based logic 206 schedules branch instructions 208 and 210 according to age based logic. For example, the older of instructions 208 and 210 may issue before the newer of the two. However, if one of the instructions 208 and 210 has its favor bit set to the first value (i.e., set to "1") then it affects how age based logic 206 treats instructions 208 and 210. For example, suppose favor bit 212 is set to the first value (i.e., to "1") while the favor bit 214 is set to the second value (i.e., to "0") the result would be and-gate 202 still having unit value ("1") as output, while and-gate 204 would switch to having null value ("0") output. The null value of and-gate 204 may be interpreted by age based logic 206 as giving lower priority to branch instruction 210.

The example above may be generalized to a plurality of threads each having favor bits set to the first value (i.e., "1"). According to the logic of FIG. 2, all the threads having such favor bits would continue to output unit values from logic gates feeding into the age based logic 206, while remaining instructions having favor bits set to the second value (i.e., "0") would have null output from logic gates feeding into the age based logic 206. Thus, the plurality of instructions having favor bits set to the first value ("1") would be give issue priority by age based logic 206 over remaining instructions having favor bits set to the second value (i.e., "0"). The age based logic 206 may then schedule the priority threads according to age. For example, older instructions may be scheduled to issue before newer instructions.

Figure 3:
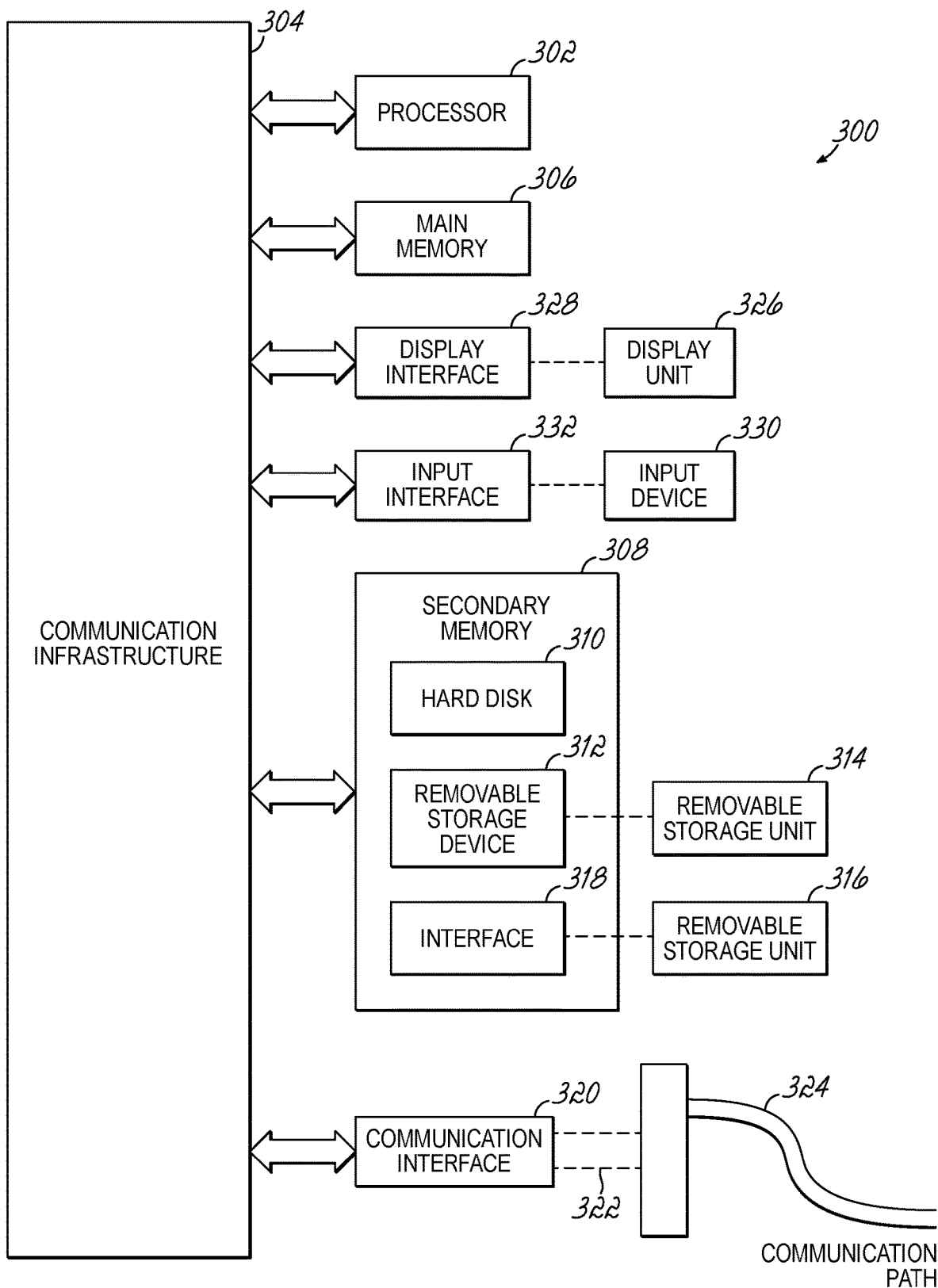
FIG. 3 is a high level block diagram showing an information processing system useful for implementing an embodiment of the present invention.

FIG. 3 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 328 that forwards graphics, text, and other data from the communication infrastructure 304 (or from a frame buffer not shown) for display on a display unit 326. The computer system also includes a main memory 306, preferably random access memory (RAM), and may also include a secondary memory 308. The secondary memory 308 may include, for example, a hard disk drive 310 and/or a removable storage drive 312 interfacing, for example, solid-state storage, a floppy disk drive, a magnetic tape drive, or an optical disk drive. The removable storage drive 312 reads from and/or writes to a removable storage unit 314 in a manner well known to those having ordinary skill in the art. Removable storage unit 314 represents, for example, a floppy disk, a compact disc, a magnetic tape, or an optical disk, etc. which is read by and written to by removable storage drive 312. As will be appreciated, the removable storage unit 314 includes a computer readable medium having stored therein computer software and/or data.

In alternative embodiments, the secondary memory 308 may include other similar means for allowing computer programs or other instructions to be loaded into the computer system. Such means may include, for example, a removable storage unit 316 and an interface 318. Examples of such means may include a program package and package interface (such as that found in video game devices), a removable memory chip (such as an EPROM, or PROM) and associated socket, and other removable storage units 316 and interfaces 318, which allow software and data to be transferred from the removable storage unit 316 to the computer system.

The computer system may also include an input interface 322 for receiving input from a user via an input device 330.

The computer system may also include a communication interface 320. Communication interface 320 allows software and data to be transferred between the computer system and external devices. Examples of communication interface 320 may include a modem, a network interface (such as an Ethernet card), a communication port, or a PCMCIA slot and card, etc. Software and data transferred via communication interface 320 are in the form of signals 322 which may be, for example, electronic, electromagnetic, optical, or other signals capable of being received by communication interface 320. These signals 322 are provided to communication interface 320 via a communication path (i.e., channel) 324. This communication path 324 carries signals and may be implemented using wire or cable, fiber optics, a phone line, a cellular phone link, an RF link, and/or other communication channels.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically includes computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. The program code may be distributed using a computer-readable storage medium having computer-readable program instructions stored thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for describing specific embodiments only and is not intended to be limiting of the embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes," "having," "has," "with," or variants thereof are used in either the detailed description or the claims, such terms are intended to be inclusive in a manner similar to the term "comprising."

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A simultaneous multi-threading (SMT) system, comprising:
    a SMT processor circuit that:
        receives, from one of a first plurality of threads, a first branch instruction comprising a favor bit;
        determines and assigns a value to a forward progress variable, for each thread in the first plurality of threads, wherein the forward progress variable for a given thread counts a number of cycles since the given thread has achieved completion;
        determines that the one of the first plurality of threads has stalled when the value of the assigned forward progress variable takes on a predetermined value;
        in response to determining that the one of the first plurality of threads has stalled, determines whether the branch instruction is a next-to-complete instruction for the one of the plurality of threads by comparing an instruction tag for the branch instruction to an instruction tag for the one of the plurality of threads;
        in response to determining that the branch instruction is the next-to-complete instruction for the one of the plurality of threads, assigns the favor bit to have the first value; and
        schedules the first branch instruction to issue, relative to branch instructions received from other threads in the first plurality of threads, based on the favor bit, wherein scheduling the branch instruction to issue comprises:
            when the favor bit has the first value, scheduling the branch instruction to have a higher priority to issue before the branch instructions received from other threads in the first plurality of threads; and
            when the favor bit has a second value, scheduling the branch instruction to issue based on an age of the branch instruction relative to respective ages of the branch instructions received from other threads in the first plurality of threads.

2. The SMT system of claim 1, wherein the SMT processor circuit is further configured:
    to determine that each thread in a second plurality of threads chosen from the first plurality of threads comprises a favor bit comprising the first value; and
    to schedule instructions of the second plurality of threads to issue based on relative ages of branch instructions within the second plurality of threads.

3. A processor implemented method of issuing branch instructions in a simultaneous multi-threading (SMT) system, the method comprising:
    receiving, by a SMT processor circuit, from one of a first plurality of threads, a branch instruction comprising a favor bit;
    determining and assigning a value to a forward progress variable, for each thread in the first plurality of threads, wherein the forward progress variable for a given thread counts a number of cycles since the given thread has achieved completion;
    determining that the one of the first plurality of threads has stalled when the value of the assigned forward progress variable takes on a predetermined value;
    in response to determining that the one of the first plurality of threads has stalled, determining whether the branch instruction is a next-to-complete instruction for the one of the first plurality of threads by comparing an instruction tag for the branch instruction to an instruction tag for the one of the plurality of threads;

in response to determining that the branch instruction is the next-to-complete instruction, setting the favor bit to a first value; and scheduling the branch instruction to issue, relative to branch instructions received from other threads in the first plurality of threads, based on the favor bit, wherein scheduling the branch instruction to issue comprises:

when the favor bit has the first value, scheduling the branch instruction to have a higher priority to issue before the branch instructions received from other threads in the first plurality of threads; and when the favor bit has a second value, scheduling the branch instruction to issue based on age of the branch instruction relative to respective ages of the branch instructions received from other threads in the first plurality of threads.

4. The processor implemented method of claim 3, further comprising:

determining, by the SMT processor circuit, that each thread in a second plurality of threads chosen from the first plurality of threads comprises a favor bit comprising the first value; and scheduling instructions of the second plurality of threads to issue based on relative ages of branch instructions within the second plurality of threads.

5. A non-transitory computer readable storage device comprising computer program instructions stored thereon that, when executed by a simultaneous multi-threading (SMT) processor circuit, cause the SMT processor circuit to perform operations comprising:

receiving, by the processor circuit, from one of a first plurality of threads, a branch instruction comprising a favor bit;

determining and assigning a value to a forward progress variable, for each thread in the first plurality of threads, wherein the forward progress variable for a given thread counts a number of cycles since the given thread has achieved completion;

determining that the one of the first plurality of threads has stalled when the value of the assigned forward progress variable takes on a predetermined value;

in response to determining that the one of the first plurality of threads has stalled, determining whether the branch instruction is a next-to-complete instruction for the one of the first plurality of threads by comparing an instruction tag for the branch instruction to an instruction tag for the one of the plurality of threads;

in response to determining that the branch instruction is the next-to-complete instruction, setting the favor bit to a first value; and scheduling the branch instruction to issue, relative to branch instructions received from other threads in the first plurality of threads, based on the favor bit, wherein scheduling the branch instruction to issue comprises:

when the favor bit has a first value, scheduling the branch instruction to have a higher priority to issue before the branch instructions received from other threads in the first plurality of threads; and when the favor bit has a second value, scheduling the branch instruction to issue based an age of the branch instruction relative to respective ages of the branch instructions received from other threads in the first plurality of threads.

6. The non-transitory computer readable storage device of claim 5, further comprising computer program instructions stored thereon that, when executed by the SMT processor circuit, cause the SMT processor circuit to perform operations comprising:

determining that each thread in a second plurality of threads chosen from the first plurality of threads comprises a favor bit comprising the first value; and scheduling instructions of the second plurality of threads to issue based on relative ages of branch instructions within the second plurality of threads.

\* \* \* \* \*